UNITED STATES PATENT OFFICE.

HEINRICH COLLOSEUS, OF BERLIN, GERMANY, ASSIGNOR, BY MESNE ASSIGNMENTS, TO COLLOSEUS CEMENT COMPANY, A CORPORATION OF NEW JERSEY.

PROCESS OF MANUFACTURING A SEA-WATER-RESISTING CEMENT FROM BLAST-FURNACE SLAG.

No. 893,706.　　　　　Specification of Letters Patent.　　　　Patented July 21, 1908.

Application filed May 17, 1907. Serial No. 374,244.

*To all whom it may concern:*

Be it known that I, HEINRICH COLLOSEUS, a chemist and a doctor of philosophy, a subject of the German Emperor, and a resident of 15 Spichernstrasse, in the city of Berlin, Kingdom of Prussia, and German Empire, have invented a certain new and useful Process of Manufacturing a Sea-Water-Resisting Cement from Blast-Furnace Slag, of which the following is a specification.

This invention has reference to a process for manufacturing cement from blast furnace slag by the introduction of certain, hereinafter specified salt solutions into the freshly prepared blast furnace slag, as drawn from the furnace, the said cement being ready to be used directly without any further additions. As compared with the previous process of converting blast furnace slag into finished cement by the introduction of small amounts of solutions of water soluble alkali salts or of the salts of alkaline earths or of the earth metals, whereby a cement which forms a perfect substitute for ordinary Portland cement is obtained, the present process hereinafter described, is distinguished by the fact, that the cement obtained by the treatment with salt solutions possesses particularly resisting qualities against the action of sea-water. This object is attained in my process by the utilization of the well-known researches of Le Chatelier, Newberry and Michaelis, who have shown that it is possible to obtain a cement which will resist the action of sea-water by replacing the alumina of the ordinary Portland cement by oxid of iron, my process being carried out by incorporating with the hot liquid slag, as freshly tapped from the furnace, small quantities of iron or of manganese, chromium, nickel and the like as aqueous solutions of any water soluble salts of the iron group, that is to say any suitable salt of iron, manganese, chromium or the like. By the injection of small amounts of salt solutions into the hot liquid blast furnace slag a physical or molecular change is known to take place in the slag partly by the sudden vaporization of the injected water, which is finely distributed throughout the slag and partly by the dissociation of the salt itself, the free lime, or a very essential proportion of the same being neutralized at the same time mostly by the effects of the dissociation, but furthermore than that, in view of the fact, that iron, manganese or chromium are incorporated with the slag in the nascent state, so to speak, immediately upon their liberation from the salts and to some extent most probably in the form of freshly liberated, colloidal oxid, which is therefore especially capable of immediate reaction, the property of being able to resist the destructive influences of the sulfuric acid compounds of the sea-water is imparted to the product, the iron, manganese and the like probably combining with the silicates and the lime, to form the bodies, which have been exhaustively studied by Newberry and Le Chatelier in their researches. Of course, mixtures of different metals of the iron group may also be used.

The perfectly dry product, obtained in accordance with this invention by the injection of solutions into the freshly drawn hot liquid slag, after having been cooled and ground to a fine flour, yields a finished cement, which is equivalent to Portland cement and which resists the action of sea water. The process is for instance carried out by allowing the hot liquid slag to flow in the well known manner upon the outer surface of a rapidly rotating drum, which by its rapid rotation produces a thorough disintegration of the particles flowing onto it. Simultaneously with the flowing of the slag onto the outer surface of the drum, the required amount of the solutions, thus for instance, a solution of sulfate of iron, is also caused to flow by means of any suitable device onto the drum. If required, the introduction of the salt solutions may be effected by means of a sprayer.

In the case of slags with from 46 to 52 per cent. of lime and 28 to 32 per cent. of silicic acid, and 12 to 16 per cent. of alumina, 10 to 30 grams of a 5 per cent. solution of the salt for 100 grams of slag are injected.

What I claim and desire to secure by Letters Patent of the United States is:—

1. The process of manufacturing sea-water resisting cement by combining therewith while in the form of spray of molten particles, a salt of the iron group which is immediately decomposed under the action of the heat while its water of solution is evaporated and assists to disintegrate and partly cool the slag, substantially as described.

2. The process of incorporating salts of the iron group with molten slag for the purpose of forming sea water resisting cement, which consists in bringing both the slag and the solution of salt into the form of a spray and allowing them to act on each other while in this form, substantially as described.

3. The process of manufacturing a sea water resisting cement, which consists in bringing molten slag into a spray-like condition and incorporating therewith from ½ to 1½ per cent. of salts of the iron group, substantially as described.

In witness whereof I have hereunto signed my name this 2nd day of May 1907, in the presence of two subscribing witnesses.

HEINRICH COLLOSEUS.

Witnesses:
WOLDEMAR HAUPT,
HENRY HASPER.